United States Patent [19]
Ward et al.

[11] Patent Number: 5,343,837
[45] Date of Patent: Sep. 6, 1994

[54] CYLINDER HEAD SEALING SYSTEM AND METHOD

[75] Inventors: Lloyd A. Ward, Washington, Ill.; Allyn P. Bock, West Lafayette, Ind.

[73] Assignee: Caterpillar Inc., Peoria, Ill.

[21] Appl. No.: 98,172

[22] Filed: Jul. 27, 1993

[51] Int. Cl.$^5$ .............................................. F16J 15/12
[52] U.S. Cl. ................... 123/193.5; 277/235 B
[58] Field of Search ............... 123/193.3, 193.5, 193.2; 277/235 B, 180

[56] References Cited

U.S. PATENT DOCUMENTS

| | | | |
|---|---|---|---|
| 1,847,729 | 3/1932 | Shaw . | |
| 3,410,256 | 11/1968 | Herschmann | 123/41.84 |
| 3,565,449 | 2/1971 | Ascencio et al. | 277/235 B |
| 3,901,200 | 8/1975 | Zaruba et al. | 123/41.73 |
| 4,211,205 | 7/1980 | Lockhart | 277/235 B |
| 4,331,336 | 5/1982 | Czernik et al. | 277/235 X |
| 4,369,980 | 1/1983 | Backlin | 277/235 B |
| 4,372,564 | 2/1983 | Nicholson | 277/235 B |
| 4,376,539 | 3/1983 | Baldacci | 277/235 B |
| 4,450,800 | 5/1984 | Kotauschek | 123/193.5 |
| 5,010,853 | 4/1991 | Kubis et al. | 123/41.84 |
| 5,033,189 | 7/1991 | Desverchere et al. | 29/888.3 |
| 5,033,426 | 7/1991 | Reichenbach et al. . | |
| 5,111,786 | 5/1992 | Fontichiaro et al. | 123/256 |
| 5,125,375 | 6/1992 | Vuk | 123/193.5 |
| 5,125,551 | 6/1992 | Slee | 277/22 |
| 5,201,534 | 4/1993 | Miyaoh | 277/235 B |

FOREIGN PATENT DOCUMENTS 2089907B 6/1982 United Kingdom .

*Primary Examiner*—Tony M. Argenbright
*Assistant Examiner*—M. Macy
*Attorney, Agent, or Firm*—Dennis C. Skarvan

[57] ABSTRACT

A thermally conductive sealing system for the cylinder head joint of an internal combustion engine is disclosed comprising a spacer plate clamped in direct contact between the cylinder head and the cylinder block and a plurality of discrete fluid gaskets disposed across the spacer plate and clamped between the cylinder head and cylinder block. The flange of a cylinder liner is received in a bore of the spacer plate and a combustion gas seal or "fire ring" is clamped in the bore between the cylinder head and the cylinder liner flange. The combustion gas seal includes a malleable sealing ring for sealing between the cylinder head and the cylinder liner and a hardened backing ring for supporting the sealing ring. The plurality of discrete fluid gaskets includes a removable lifter compartment gasket including sealing elements attached across a substrate and a plurality of coolant ferrules for sealing across coolant ports and around cylinder head bolts.

21 Claims, 5 Drawing Sheets

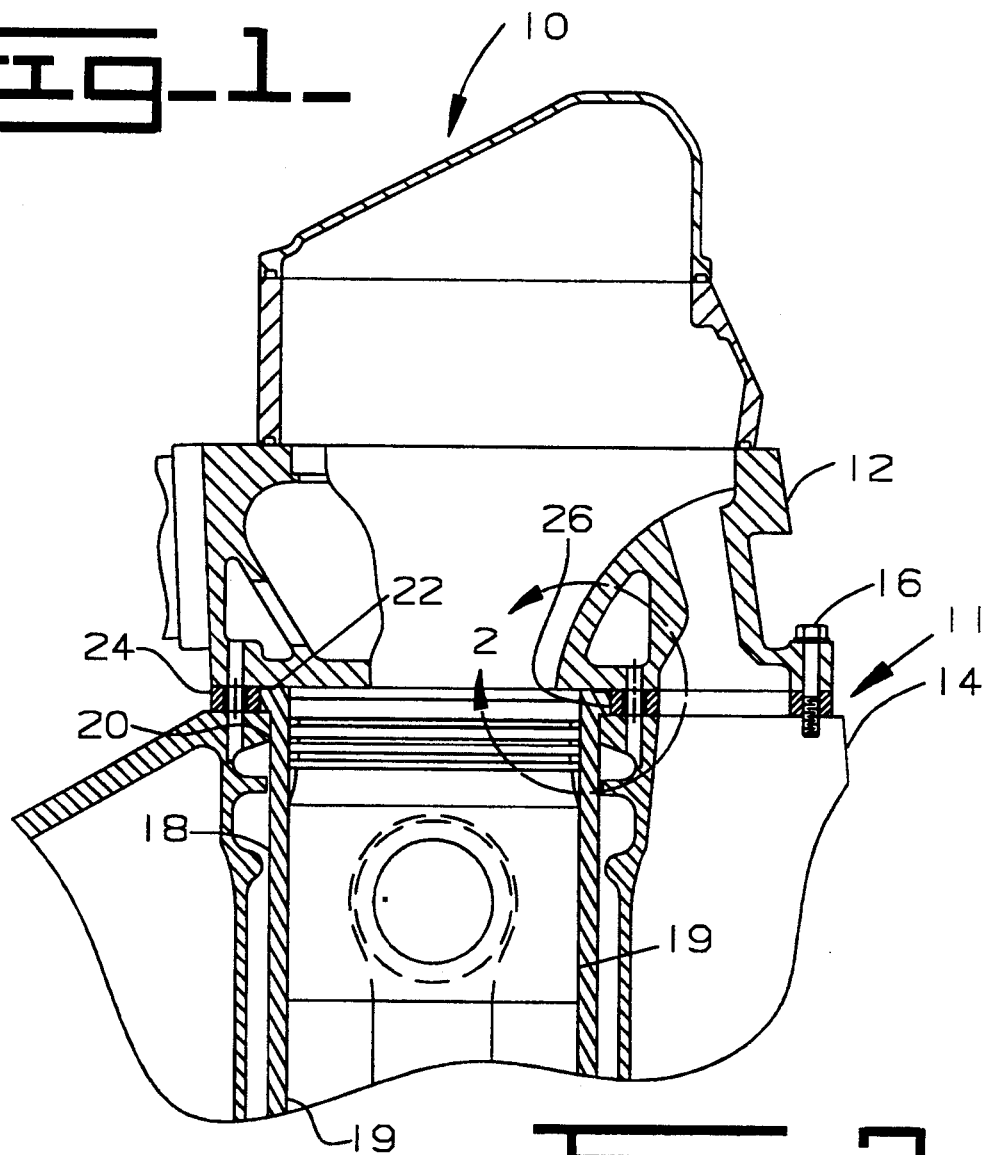
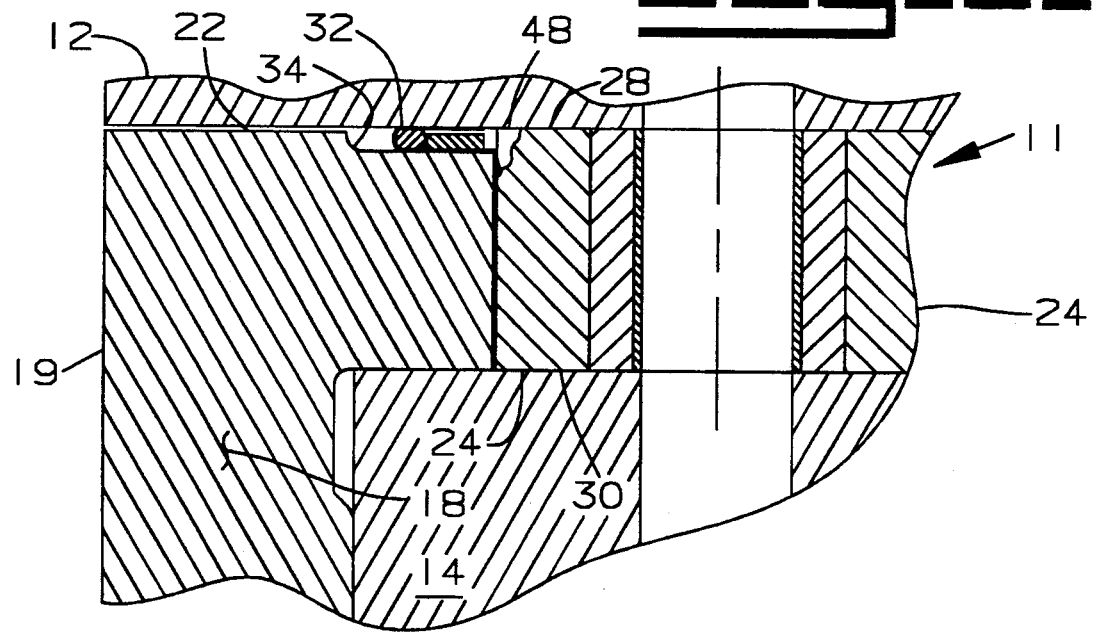

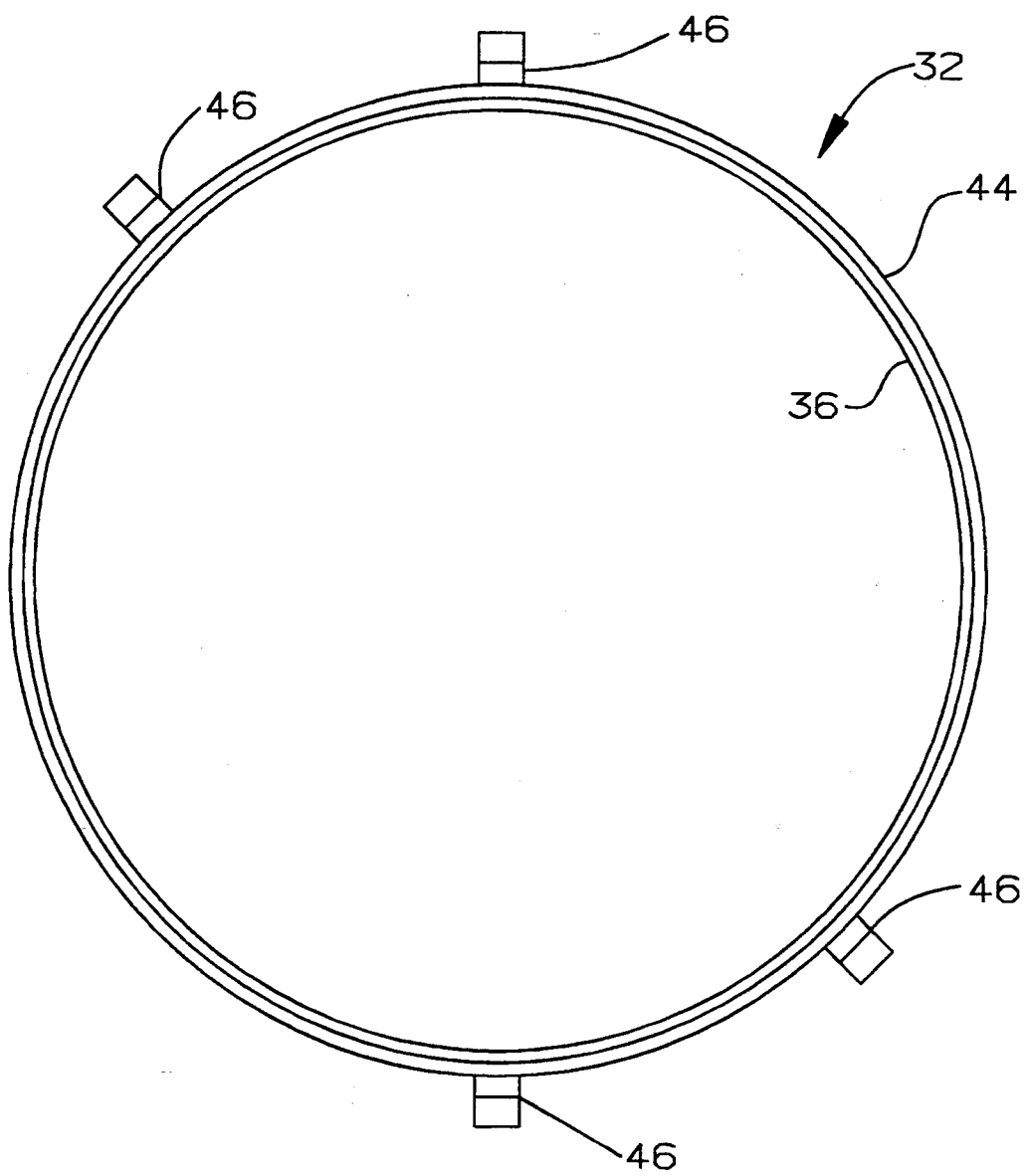
Fig_3_

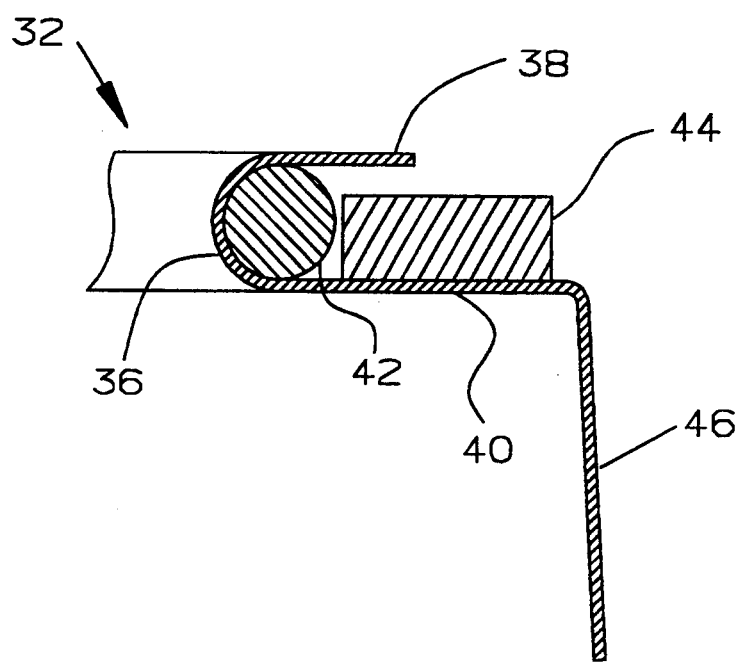
Fig_4_
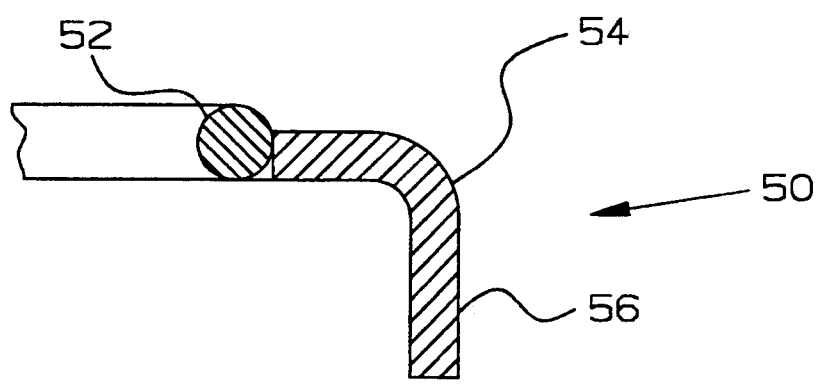
Fig_5_

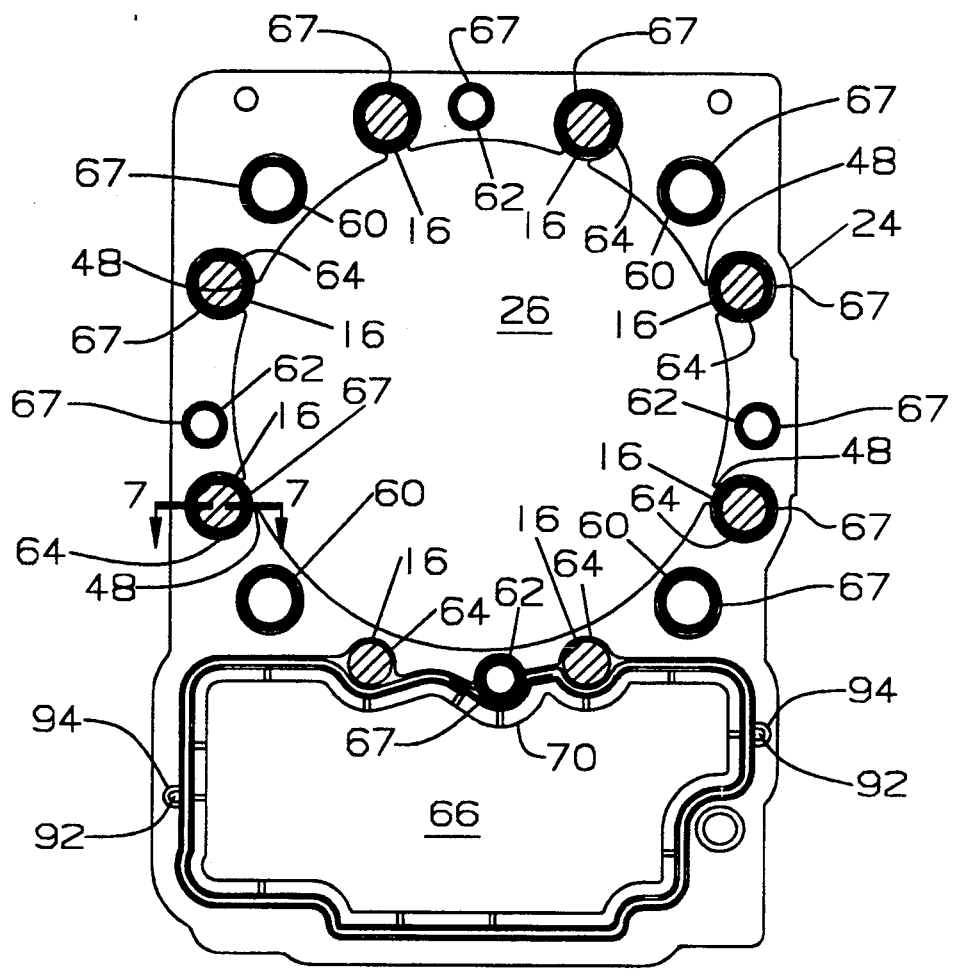
Fig_6_
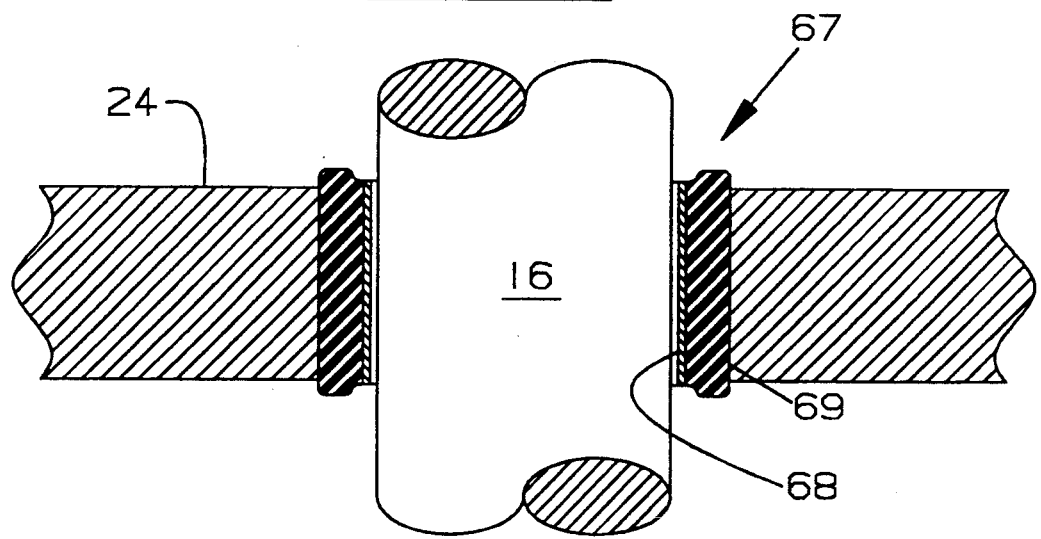
Fig_7_

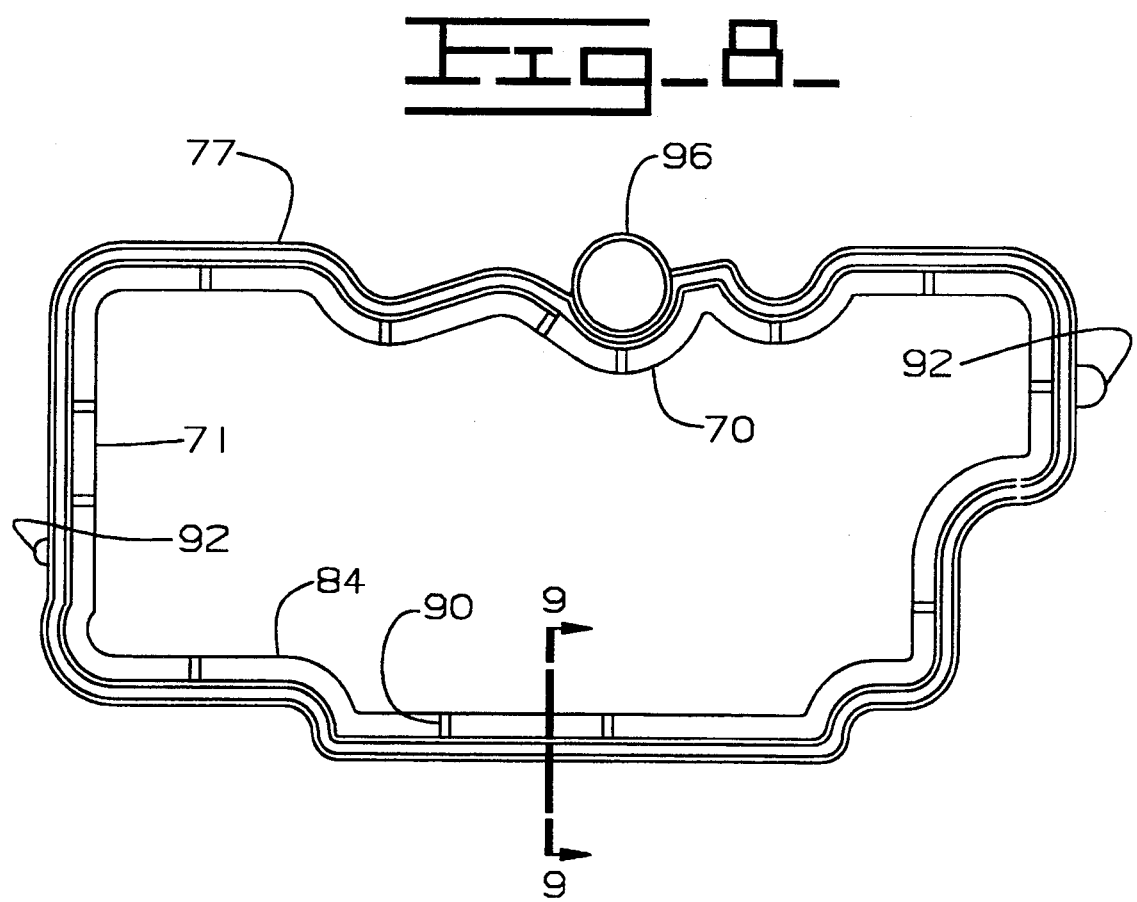
Fig_8_
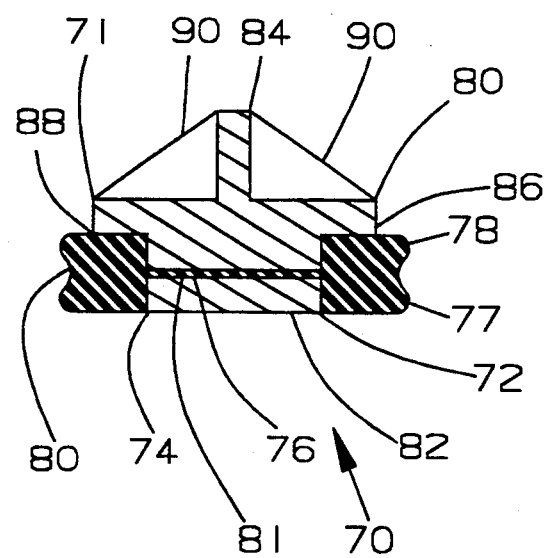
Fig_9_

CYLINDER HEAD SEALING SYSTEM AND METHOD

FIELD OF THE INVENTION

This invention relates generally to a thermal stop cylinder head joint and sealing system that limits thermally induced loads from the cylinder head to the cylinder head gasket, block and liner and, more particularly, to head gaskets and combustion gas seals for sealing receipt between a cylinder head and a cylinder block or liner of an internal combustion engine.

BACKGROUND OF THE INVENTION

The cylinder head joint is a critical sealing joint in an internal combustion engine, particularly in high compression diesel engines. In addition to the typical sealing problems encountered at the cylinder head joint, such as preventing blowout of the combustion gas seal or wire ring while maintaining a coolant and/or oil tight head seal, diesel engines that employ flanged cylinder liners further complicate sealing of the cylinder head joint. For example, to avoid high unit loadings and associated crack initiation where the flange of the cylinder liner engages the engine block, a spacer plate or plates are provided in the cylinder head joint between the cylinder head and block. The spacer plates provide clearance for the flange of the cylinder liner to be mounted on the cylinder block in the cylinder head joint, rather than in a counter bore of the cylinder block, to reduce crack initiation in the cylinder block. Additionally, the spacer plates distribute mechanically induced cylinder head loads into the cylinder block without concentrating the loads on any one part of the cylinder block; i.e., the liner flange to cylinder block interface. Typically, the spacer plates are constructed of a thermally conductive material such as aluminum to distribute thermally induced cylinder head loads and reduce high thermal unit loading of the cylinder block.

Presently, diesel engines employing flanged cylinder liners and spacer plates at the cylinder head joint have required gaskets clamped both between the cylinder block and spacer plate and between the spacer plate and cylinder head. These gaskets are shaped similar to the spacer plate and, for combination head gaskets with integral combustion gas seals, seal combustion gasses within the cylinder liner and both coolant and/or oil between the cylinder block and head. Although these gaskets adequately seal across the cylinder head joint, they nevertheless can be subject to some leakage due to thermal loading during engine transients. Further, due to varying tolerances of the gaskets, the loading across the cylinder head joint can vary.

As a result of these and other sealing difficulties, various gaskets have been developed in an attempt to improve sealing of the cylinder head joint. For example, U.S. Pat. No. 5,125,551 to Slee discloses a combination cylinder head gasket and combustion gas seal which includes heat conductive elements between integral metal fire rings in an attempt to reduce thermal loading of the gasket However, the cylinder head gasket disclosed in U.S. Pat. No. 5,125,551 adds complexity and cost while still being susceptible to failure due to non-uniform heating during engine operation.

As another example, the combination cylinder head gasket and combustion gas seal shown in U.S. Pat. No. 5,125,375 to Vuk is adapted for use with a specially machined cylinder liner in an attempt to resist blowout of the integral combustion gas seal. The flange of the cylinder liner is machined frustoconical and cooperates with the cylinder head to produce a wedging action that resists radial expansion of the combustion gas seal when clamped between the cylinder head and liner. Aside from the machining difficulty involved in creating the frustoconical contour, the gasket disclosed in U.S. Pat. No. 5,125,375 relies on a preset clearance between the cylinder flange and cylinder head to provide the necessary wedging action with the frustoconical contour. Should the cylinder head be improperly assembled or should the preset clearance become insufficient due to creep of the combustion gas seal, the gasket can be subject to blowout.

A cylinder head gasket that combines a flexible sealing element with a metal gasket body to prevent detachment of the sealing element from the gasket body is shown in U.S. Pat. No. 5,033,189 to Desverchere et al. Flexible sealing elements on either side of the metal gasket body are joined together through slots in the metal gasket body to reduce the risk of the sealing elements becoming detached therefrom. One disadvantage of this construction is that the flexible sealing element is formed integral with the metal gasket body, thus requiring the entire gasket body to be discarded should a portion of the flexible sealing element fail.

What is needed is an improved gasket and gasket sealing system for use in the cylinder head joint of an internal combustion engine that overcomes the aforementioned deficiencies of the gaskets disclosed in U.S. Pat. Nos. 5,125,375, 5,033,189 and 5,125,551. Such a gasket sealing system should be compatible with diesel engines employing flanged cylinder liners and spacer plates at the cylinder head joint. Ideally, such a gasket sealing system should be inexpensive to manufacture and easily installed and, together with the spacer plate, should reduce thermal loading from the cylinder head to the combustion gas seal and cylinder block or liner.

SUMMARY OF THE INVENTION

According to one embodiment of the present invention, a combustion gas seal is disclosed comprising a malleable sealing ring disposed between a cylinder head and a cylinder block or liner of an internal combustion engine. The malleable sealing ring is crushable between the cylinder head and the cylinder block or liner to form a seal when clamped therebetween. A backing ring is disposed adjacent to and radially outward of the malleable sealing ring for supporting the malleable sealing ring against deformation during operation of the engine.

According to another embodiment of the present invention, an improvement in a cylinder head joint of an internal combustion engine is disclosed, the cylinder head joint including a combustion gas seal and a spacer plate, the spacer plate being clamped at a predetermined clamp load between a cylinder head and a cylinder block, the cylinder block including a cylinder liner having a flanged portion extending upwardly from the cylinder block through a bore of the spacer plate, the improvement comprising the spacer plate being clamped in direct contact between the cylinder head and the cylinder block and the combustion gas seal being clamped in the bore of the spacer plate in sealing contact between the flanged portion of the cylinder liner and the cylinder head.

According to yet another embodiment of the present invention, a method for sealing a cylinder head joint of an internal combustion engine is disclosed comprising the steps of obtaining a spacer plate having a top mounting surface and a bottom mounting surface, the spacer plate including at least one cylinder liner through hole for receiving a cylinder liner therein, placing the spacer plate on the cylinder block with the bottom mounting surface contacting the cylinder block mounting surface and with the cylinder liner received in the at least one cylinder liner through hole, placing a combustion gas seal in the cylinder liner through hole onto the cylinder liner, placing the cylinder head on the spacer plate and the combustion gas seal, and clamping the spacer plate between the cylinder head and the cylinder block and the combustion gas seal between the cylinder head and the cylinder liner.

One object of the present invention is to provide an improved gasket sealing system for the cylinder head joint of an internal combustion engine.

Another object of the present invention is to provide an improved combustion gas seal or "fire ring" for use in the cylinder head joint of an internal combustion engine.

Yet another object of the present invention is to provide an improved head gasket for sealing engine fluids such as coolant and/or oil communicated between the cylinder head and cylinder block.

Still yet another object of the present invention is to provide an improved thermal joint between the cylinder head and cylinder block of an internal combustion engine that reduces thermal unit loading of the cylinder block.

Yet another object of the present invention is to provide an improved head joint that reduces thermal loading of the combustion gas seal during engine transients.

These and other related objects and advantages of the present invention will become apparent from the following drawings and written description.

BRIEF DESCRIPTION OF THE DRAWINGS

FIG. 1 is a partial side cross-sectional view depicting a cylinder head joint of a diesel engine according to one embodiment of the present invention.

FIG. 2 is an exploded cross-sectional view of the cylinder head joint of FIG. 1.

FIG. 3 is a top plan view of a combustion gas seal or "fire ring" of the cylinder head joint of FIG. 1.

FIG. 4 is a partial side cross-sectional view of the combustion gas seal of FIG. 3.

FIG. 5 is a partial side cross-sectional view of an alternate combustion gas seal for use in the cylinder head joint of FIG. 1.

FIG. 6 is a top plan view of a spacer plate having coolant ferrules for sealing coolant ports and cylinder head bolts and a replaceable gasket for sealing a lifter compartment of the cylinder head joint of FIG. 1.

FIG. 7 is a side cross-sectional view of the coolant ferrule taken along line 7—7 of FIG. 6.

FIG. 8 is a top plan view of the replaceable lifter compartment gasket of FIG. 6.

FIG. 9 is a partial side cross-sectional view of the replaceable lifter compartment gasket taken along line 9—9 of FIG. 8.

DESCRIPTION OF THE PREFERRED EMBODIMENT

Referring to FIG. 1, a diesel engine 10 is shown incorporating a cylinder head joint 11 according to one embodiment of the present invention. Engine 10 includes a cylinder head 12 mounted clamped on a cylinder block 14 via a plurality of cylinder head bolts 16. A cylinder liner 18 is slidably mounted within a bore 20 of cylinder block 14. Cylinder liner 18 defines a cylinder bore 19 and includes a flanged portion 22 extending upwardly from cylinder block 14 into the cylinder head joint. A spacer plate 24 is mounted between cylinder head 12 and cylinder block 14 and includes a cylinder liner through hole 26 for receiving flanged portion 22 of cylinder liner 18 therein. Spacer plate 24 distributes both mechanical and thermally induced cylinder head loads from the cylinder head into the cylinder block without concentrating the cylinder head loads at any one portion of the cylinder block.

Prior to the present invention, a head gasket in the form of a gasket plate was mounted clamped between the spacer plate 24 and engine block 14 to seal across engine fluid passageways such as the seal lifter compartment and coolant ports. Similarly, a head gasket incorporating a combustion gas seal or "fire ring" was mounted clamped between the cylinder head and spacer plate. The present invention eliminates the need for head gaskets between the spacer plate and cylinder head and between the spacer plate and cylinder block and relies instead on discrete gaskets and seals at the various specific fluid interfaces across the cylinder head joint.

For example, referring now to FIG. 2, the cylinder head joint 11 of the present invention is shown in greater detail. In FIG. 2, the top and bottom mounting surfaces 28 and 30, respectively, of spacer plate 24 are mounted contacting corresponding mounting surfaces of cylinder head 12 and cylinder block 14. By directly contacting cylinder head 12 onto spacer plate 24 and directly contacting spacer plate 24 onto cylinder block 14, any insulative gaps present across the cylinder head joint are eliminated so that heat is conducted evenly and directly across the cylinder head joint. Further, during transient operation of the engine, the solid abutment of the spacer plate between the cylinder head and cylinder block resists thermal loading of the combustion gas seal and reduces motion of the cylinder head relative to the combustion gas seal and cylinder block. As a result, distortion and wearing of the combustion gas seal is minimized to provide a more stable cylinder head joint.

Preferably, spacer plate 24 is constructed of a conductive material such as aluminum so that the heat loading conducted from cylinder head 12 is substantially evenly distributed through spacer plate 24 prior to being conducted into cylinder block 14. As such, severe temperature gradients from the cylinder head are reduced across spacer plate 24 to reduce thermal loading of cylinder block 14. Additionally, the thermal growth characteristics of an aluminum spacer plate relative to those of the cylinder head, block and liner ensure a tight cylinder head joint at engine operating temperatures. To facilitate direct contact between the cylinder head, spacer plate and cylinder block, discrete gaskets are provided situated across the spacer plate between the cylinder head and cylinder block or liner to selectively seal the various fluid interfaces across the cylinder head joint.

For example, rather than providing an integral head gasket and combustion gas seal across the cylinder head clamped between the cylinder head and spacer plate to seal both combustion gasses and engine oil and/or coolants, a discrete combustion gas seal or fire ring 32 is provided clamped between flanged portion 22 of cylinder liner 18 and cylinder head 12 to seal only combustion gasses. Fire ring 32 is received in an annular slot 34 machined in liner 18 so that a predetermined clamp load is applied across ring 32. The clamp load applied to fire ring 32 is set by the predetermined clearance in slot 34 between the cylinder liner and the cylinder head, rather than solely by the cylinder head bolt load, when the cylinder head is clamped in place against spacer plate 24 onto block 14. As a result, the clamp load applied to fire ring 32 is selectable independent of the clamp load applied by the cylinder head bolts across the spacer plate. Also, by eliminating the gaskets between the cylinder head and spacer plate and between the spacer plate and cylinder block, the tolerance stack and associated load variation across the combustion gas seal is reduced to permit increased nominal loading of the combustion gas seal. Similarly, torque relaxation of the cylinder head bolts is reduced since the overall assembly of the cylinder head joint is less susceptible to dimensional change due to creep of the various gaskets and seals.

Referring now to FIGS. 3 and 4, combustion gas seal or fire ring 32 is shown in greater detail. Fire ring 32 includes an annular sleeve 36 having an upper sealing member 38 adapted for sealing contact against cylinder head 12 and a lower sealing member 40 adapted for sealing contact against cylinder liner 18. A malleable sealing ring 42 is disposed in annular sleeve 36 between upper sealing member 38 and lower sealing member 40. Malleable sealing ring 42 is crushable within annular sleeve 36 to provide a conforming seal between the cylinder head and the cylinder liner when clamped in place. To prevent annular sleeve 36 and sealing ring 42 from blowing out under high combustion gas pressures, a backing ring 44 is disposed in annular sleeve 36 radially outward of malleable sealing ring 42. Backing ring 44 is constructed of a material having sufficient strength to support sealing ring 42 against deformation at the high combustion gas pressures. For example, at gas pressures in excess of 2000 pounds per square inch and including a factor of safety as known in the art, backing ring 44 is constructed of a material having an ultimate tensile strength in the range of about 70,000 to about 130,000 pounds per square inch and, preferably, of about 107,000 pounds per square inch for supporting the sealing ring against a design gas pressure of approximately 4000 pounds per square inch.

Preferably, annular sleeve 36 is generally U-shaped in cross-section to wrap around malleable sealing ring 42 and restrain sealing ring 42 in place. Further, to facilitate assembly of fire ring 32 in annular slot 34 centered about cylinder bore 19, means for centering are provided in the form of a plurality of peripherally spaced tabs 46 attached to annular sleeve 36. Tabs 46 cooperate with flanged portion 22 of cylinder liner 18 to locate gasket 36 centered both within annular slot 34 and about cylinder bore 19 (FIG. 2). In one specific embodiment, annular sleeve 36 and sealing ring 42 are constructed of stainless steel, wherein sealing ring 42 is fully annealed having a hardness in the range of 78–88 on a Rockwell 15-T scale. In this specific embodiment, backing ring 44 is similarly constructed of stainless steel having a hardness of at least 20 on a Rockwell C scale to provide the necessary strength for supporting the fully annealed sealing ring. Fire ring 32 is indexed as well relative to the cylinder bore and liner to prevent rotation of the gasket during assembly. For example, in FIG. 2, a plurality of peripherally spaced slots 48 are provided in spacer plate 24 corresponding to tabs 46 so that tabs 46 are received in slots 48 when assembled in place in annular slot 34.

Other discrete combustion gas seals or fire rings are contemplated that include a malleable sealing ring and backing ring for sealing receipt between cylinder head 12 and cylinder liner 18. For example, referring now to FIG. 5, an alternate combustion gas seal or fire ring 50 is depicted employing a two-piece construction. A malleable sealing ring 52 similar to sealing ring 42 seals between the cylinder head and liner. A separate backing ring 54 prevents blowout of sealing ring 52 under high combustion pressures. The backing ring 54 further incorporates means for centering and indexing sealing ring 52 about cylinder bore 19 in the form of integral downwardly extending tabs 56.

Similar to the discrete combustion gas seal 32, other discrete gaskets and/or seals are provided in lieu of a head gasket to seal various coolant and oil fluid interfaces across the spacer plate. For example, rather than providing head gaskets between the cylinder head and spacer plate and/or between the spacer plate and cylinder block, discrete gaskets are received across the spacer plate in sealing contact between the cylinder head and cylinder block. Referring now to FIG. 6, spacer plate 24 is shown in greater detail including a variety of discrete engine fluid seals contained by the spacer plate. The spacer plate 24 includes a plurality of coolant ports 60 and 62 disposed about cylinder liner through hole 26 for communicating engine coolant between the cylinder head 12 and cylinder block 14. Disposed between coolant ports 60 and 62 are cylinder head bolt through holes 64 for receiving cylinder head bolts 16 therethrough. Adjacent to the liner flange through hole 26 is an irregular-shaped crankcase through hole 66 which provides clearance for a valve lifter and communicates with a valve lifter compartment.

A plurality of various sized coolant ferrules 67 are disposed in coolant ports 60 and 62 for sealing engine coolant between the cylinder head and the cylinder block. The present invention further utilizes coolant ferrules 67 to seal about cylinder head bolts 16, thereby preventing any coolant leakage from corroding the cylinder head bolts and preventing any combustion gas leakage from relaxing the cylinder head bolt material. Referring now to FIG. 7, coolant ferrules 67 are generally cylindrical in shape and include a cylindrical metal core 68 encased in a rubber or plastic sheath 69. Sheath 69 extends beyond core 68 so that when the ferrule is clamped between the cylinder head and block, only the rubber or plastic sheath 69 deforms to provide a liquid-tight seal supported between the cylinder head and the cylinder block by the metal core 68.

Because the present invention eliminates gasket plates between the spacer plate and cylinder block, an additional seal 70 is required for sealing across spacer plate 24 about the lifter compartment. Gasket 70 is irregularly shaped to conform to the shape of the lifter compartment through hole 66. Referring now to FIGS. 8 and 9, gasket 70 includes a rigid substrate 71 having an upper sealing surface 72, a lower sealing surface 74, and a plurality of connecting holes 76 extending between upper sealing surface 72 and lower sealing surface 74. A flexible sealing element 77 is received across the rigid substrate and includes an upper sealing element 78 for sealing between upper sealing surface 72 and cylinder head 12 and a lower sealing element 80 for sealing between lower sealing surface 74 and cylinder block 14. Sealing elements 78 and 80 are interconnected by a plurality of connecting elements 81 received through the connecting holes 76. Connecting elements 81 restrain the sealing elements 78 and 80 across substrate 71 to prevent the sealing elements 78 and 80 from detaching therefrom.

Sealing elements 78 and 80 are preferably sized larger than the connecting elements 81 so that, although being attached to one another, sealing elements 78 and 80 deform independently when clamped to seal separate from one another. For example, referring to FIG. 9, the cross-sectional width of sealing elements 78 and 80 is depicted larger than the cross-sectional diameter of connecting element 81. Preferably, the cross-sectional width of each of sealing elements 78 and 80 is at least twice as great as the cross-sectional diameter of connecting element 81 to provide sufficient sealing area for surfaces 72 and 74 to support sealing elements 78 and 80 independent of one another. Additionally, the height of sealing elements 78 and 80 from sealing surfaces 72 and 74, respectively, is depicted shorter than the length of connecting element 81 between sealing surfaces 72 and 74. Preferably, the length of connecting element 81 between sealing surfaces 72 and 74 is at least two times the height of each sealing element 78 and 80 from sealing surfaces 72 and 74 and, in the specific embodiment shown in FIG. 9, in the range of about two to three times the height of each sealing element 78 and 80 from sealing surfaces 72 and 74.

Rigid substrate 71 includes a rectangularly shaped cross-sectional core portion 82 defining upper sealing surface 72 and lower sealing surface 74 and containing connecting holes 76 therebetween. Additionally, a backing portion 84 is provided to further support the sealing elements. The backing portion 84 extends above upper sealing surface 72 to define a shoulder 86 for restraining the upper sealing element 78 in place. Similarly, backing portion 84 extends below lower sealing surface 74 to define a shoulder 88 for restraining lower sealing element 80 in place. As such, the flexible sealing elements 78 and 80 are further restrained from being detached from the substrate during assembly. To further bolster shoulders 86 and 88, the backing portion 84 is generally T-shaped in cross-section and includes gussets 90 for reinforcing shoulders 86 and 88 across the T-shaped cross-section.

Unlike prior art gasket plates which employ integral flexible sealing elements attached thereacross, gasket 70 is supported independent of spacer plate 24 by the rigid substrate 71 and, therefore, is easily replaceable. As such, refurbishment of gasket 70 does not require replacement of the spacer plate. Further, the gasket is easily constructed of molded plastic to facilitate incorporation of the various shoulders and gussets for added strength and rigidity. Gasket 70 includes locating pins 92 which are received in corresponding slots 94 of spacer plate 24 to restrain gasket 70 in place during assembly. In one specific embodiment, gasket 70 is shaped to provide clearance for cylinder head bolts 16, as shown in FIG. 6, and is molded to provide an integral fluid passageway 96 adapted for receiving a coolant ferrule 67 and communicating engine fluids similar to coolant ports 62. Preferably, substrate 71 is constructed of a rigid plastic and the sealing elements are constructed of a flexible elastomer. For example, in the preferred embodiment rigid substrate 71 is constructed either of polyethersulfone (PES) or an approximately 30% by weight glass-filled polymeric amide such as Nylon and the sealing elements are constructed either of a highly saturated nitrile rubber (HSN) or a fluorocarbon such as a vinylidene fluoride—hexafluoropropylene copolymer (Viton).

INDUSTRIAL APPLICABILITY

To assemble the cylinder head joint, spacer plate 24 is placed on cylinder block 14 with bottom mounting surface 30 contacting a corresponding mounting surface of the cylinder block and with flanged portion 22 of cylinder liner 18 received in cylinder liner through hole 26. A plurality of appropriately sized coolant ferrules 67 corresponding to the plurality of coolant ports 60 and 62 of the spacer plate are placed one for one and contained in the plurality of coolant ports. A second plurality of appropriately sized coolant ferrules 67 corresponding to the plurality of cylinder bolt through holes 64 are placed one for one about cylinder head bolts 16 and contained in the plurality of cylinder head bolt through holes. Lifter compartment gasket 70 is placed in lifter compartment through hole 66 and oriented with tabs 92 received in corresponding slots 94 of the spacer plate.

Combustion gas seal 32 is placed in slot 34 on the top surface of cylinder liner flange 34. The combustion gas seal is centered about cylinder bore 19 during assembly by locating tabs 46 over flanged portion 22. Combustion gas seal 32 is indexed in place by inserting tabs 46 into slots 48 of spacer plate 24. Tabs 46 cooperate with spacer plate 24 to maintain combustion gas seal 32 in place on cylinder liner 18 during assembly.

Cylinder head 12 is clamped onto cylinder block 14 via cylinder head bolts 16 with the mounting surface of cylinder head 12 contacting top mounting surface 28 of spacer plate 24 and combustion gas seal 32. When clamped, cylinder head 12 and cylinder liner 18 define a predetermined assembly clearance therebetween in cylinder liner through hole 26. Spacer plate 24 is clamped at a first predetermined clamp load between cylinder head 12 and cylinder block 14, and combustion gas seal 32 is clamped in the predetermined assembly clearance at a second predetermined clamp load selectable independent of the first predetermined clamp load. For example, the cylinder head bolt load applied across the spacer plate during assembly can be selected sufficiently high to accommodate the differential thermal expansion across the cylinder head joint without loading the combustion gas seal at assembly. Similarly, the combustion gas seal load can be selected sufficiently high at assembly to maintain a tight gas seal at peak cylinder pressures without simultaneously loading the remaining fluid seals and cylinder head bolts.

What is claimed is:

1. A combustion gas seal for sealing receipt about a cylinder bore clamped between a cylinder head and a cylinder block or liner of an internal combustion engine, comprising:

an annular sleeve generally U-shaped in cross-section, said annular sleeve including an upper sealing member adapted for sealing contact against the cylinder head and a lower sealing member adapted for sealing contact against the cylinder block or liner;

a malleable sealing ring disposed in said annular sleeve between said upper sealing member and said lower sealing member, said malleable sealing ring being crushable within said annular sleeve between the cylinder head and the cylinder block or liner to form a seal when clamped therebetween;

a backing ring disposed in said annular sleeve adjacent to and radially outward of said malleable sealing ring for supporting said malleable sealing ring against deformation during operation of the engine, said backing ring being constructed from a material having an ultimate tensile strength greater than 70,000 pounds per square inch; and means for centering said combustion gas seal about the cylinder bore, said means for centering including a plurality of peripherally spaced tabs attached to said annular sleeve and cooperative with the cylinder block or cylinder liner to locate said combustion gas seal centered about the cylinder bore.

2. The combustion gas seal of claim 1, wherein said backing ring is constructed of steel having a minimum hardness of 20 on a Rockwell C scale.

3. A combustion gas seal for sealing receipt about a cylinder bore clamped between a cylinder head and a cylinder block or liner of an internal combustion engine, comprising:

a malleable sealing ring disposed between the cylinder head and the cylinder block or liner;

said malleable sealing ring being crushable between the cylinder head and the cylinder block or liner to form a seal when clamped therebetween; and a backing ring disposed adjacent to and radially outward of said malleable sealing ring for supporting said malleable sealing ring against deformation during operation of the engine;

wherein said backing ring is constructed from a material having an ultimate tensile strength greater than 70,000 pounds per square inch.

4. The combustion gas seal of claim 3, and further comprising:

an annular sleeve including an upper sealing member adapted for sealing contact against the cylinder head and a lower sealing member adapted for sealing contact against the cylinder block or liner;

wherein said malleable sealing ring is disposed in said annular sleeve between said upper sealing member and said lower sealing member, said malleable sealing ring being crushable within said annular sleeve between the cylinder head and the cylinder block or liner when clamped therebetween; and wherein said backing ring is disposed in said annular sleeve radially outward of said malleable sealing ring.

5. The combustion gas seal of claim 4, and further comprising means for centering said combustion gas seal about the cylinder bore.

6. The combustion gas seal of claim 5, wherein said annular sleeve is generally U-shaped in cross-section.

7. The combustion gas seal of claim 4, wherein said annular sleeve is generally U-shaped in cross-section.

8. The combustion gas seal of claim 3, wherein said backing ring is constructed of stainless steel having a minimum hardness of 20 on a Rockwell C scale.

9. In a cylinder head joint of an internal combustion engine, the cylinder head joint including a combustion gas seal and a spacer plate, said spacer plate being clamped at a predetermined clamp load between a cylinder head and a cylinder block, said cylinder block including a cylinder liner having a flanged portion extending upwardly from said cylinder block through a bore of said spacer plate, the improvement comprising said spacer plate being clamped in direct contact between said cylinder head and said cylinder block and said combustion gas seal being clamped in said bore in sealing contact between said flanged portion of said cylinder liner and said cylinder head.

10. The improvement of claim 9, wherein said cylinder head and said flanged portion of said cylinder liner define a predetermined assembly clearance in said bore for receiving said combustion gas seal at a predetermined clamp load therein selectable independent of the predetermined clamp load across said spacer plate.

11. The improvement of claim 10, wherein said combustion gas seal includes:

a malleable sealing ring disposed in said bore and adapted for sealing between said cylinder head and said cylinder liner; and a hardened backing ring disposed in said bore adjacent to and radially outward of said malleable sealing ring.

12. The improvement of claim 11, wherein said combustion gas seal further includes:

an annular sleeve disposed about said malleable sealing ring, said annular sleeve including an upper sealing member for sealing contact against said cylinder head and a lower sealing member for sealing contact against said cylinder liner;

said malleable sealing ring being crushable within said annular sleeve between said cylinder head and said cylinder liner when clamped therebetween.

13. The improvement of claim 12, wherein said annular sleeve is generally U-shaped in cross-section.

14. The combustion gas seal of claim 13, wherein said backing ring is constructed from a material having an ultimate tensile strength greater than 70,000 pounds per square inch.

15. The improvement of claim 14, wherein said hardened backing ring is constructed of stainless steel having a minimum hardness of 20 on a Rockwell C scale.

16. The improvement of claim 9, and further comprising means for centering said combustion gas seal about a cylinder bore of said cylinder liner.

17. The improvement of claim 16, wherein said means for centering includes a plurality of peripherally spaced tabs attached to said annular sleeve and cooperative with said cylinder liner to locate said combustion gas seal centered about said cylinder bore.

18. The improvement of claim 17, and further comprising means for circumferentially indexing said combustion gas seal about said cylinder bore.

19. The improvement of claim 18, wherein said means for circumferentially indexing includes a plurality of peripherally spaced slots disposed in said spacer plate adjacent to said bore thereof, said plurality of peripherally spaced tabs being received indexed in said plurality of peripherally spaced slots.

20. A method for sealing a cylinder head joint of an internal combustion engine, the internal combustion engine including a cylinder head having a cylinder head mounting surface, a cylinder block having a cylinder block mounting surface and a cylinder liner mounted in a bore of the cylinder block, the cylinder liner defining a cylinder bore and including a flange extending upwardly from the cylinder block, the method for sealing comprising the steps of:

obtaining a spacer plate having a top mounting surface and a bottom mounting surface, said spacer plate including at least one cylinder liner throughhole for receiving the cylinder liner therein;

placing said spacer plate on the cylinder block with said bottom mounting surface contacting the cylinder block mounting surface and with the cylinder liner received in said at least one cylinder liner throughhole;

placing a combustion gas seal in said cylinder liner through hole onto the cylinder liner;

placing the cylinder head on said spacer plate and said combustion gas seal; and clamping said spacer plate between the cylinder head and the cylinder block and said combustion gas seal between the cylinder head and the cylinder liner.

21. The method of claim 20, wherein the cylinder head and the cylinder liner define a predetermined assembly clearance in said cylinder liner through hole and, in the step of clamping said spacer plate between the cylinder head and the cylinder block and said combustion gas seal between the cylinder head and the cylinder liner, said spacer plate is clamped between the cylinder head and the cylinder block at a first predetermined clamp load and said combustion gas seal is clamped in said predetermined assembly clearance at a second predetermined clamp load selectable independent of said first predetermined clamp load.

* * * * *